United States Patent
Jeong et al.

(10) Patent No.: US 8,042,999 B2
(45) Date of Patent: Oct. 25, 2011

(54) ON DIE THERMAL SENSOR OF SEMICONDUCTOR MEMORY DEVICE

(75) Inventors: Chun-Seok Jeong, Kyoungki-do (KR); Yong-Ki Kim, Kyoungki-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 556 days.

(21) Appl. No.: 11/646,328

(22) Filed: Dec. 28, 2006

(65) Prior Publication Data

US 2007/0280330 A1    Dec. 6, 2007

(30) Foreign Application Priority Data

May 31, 2006    (KR) .................. 10-2006-0049117

(51) Int. Cl.
*G01K 7/00* (2006.01)
*G11C 7/00* (2006.01)

(52) U.S. Cl. ........ 374/170; 327/513; 374/178; 374/141; 365/222

(58) Field of Classification Search .......... 374/170–173, 374/178, 141, 1; 327/512–513, 536–537, 327/291, 378; 702/99, 130–136; 711/105; 324/759–765; 712/224; 713/601; 714/718; 365/201, 210–211, 222
See application file for complete search history.

(56) References Cited

U.S. PATENT DOCUMENTS

| | | | |
|---|---|---|---|
| 4,165,642 A | 8/1979 | Lipp | |
| 5,638,029 A * | 6/1997 | O'Shaughnessy | 331/44 |
| 5,784,328 A | 7/1998 | Irrinki et al. | |
| 6,097,180 A * | 8/2000 | Tsukude et al. | 323/313 |
| 6,125,075 A * | 9/2000 | Watanabe et al. | 365/230.06 |
| 6,297,624 B1 * | 10/2001 | Mitsui et al. | 323/316 |
| 6,667,925 B2 | 12/2003 | Kobayashi et al. | |
| 6,721,223 B2 * | 4/2004 | Matsumoto et al. | 365/222 |
| 6,731,558 B2 * | 5/2004 | Yamauchi et al. | 365/222 |
| 6,756,856 B2 * | 6/2004 | Song et al. | 331/176 |
| 6,876,250 B2 | 4/2005 | Hsu et al. | |
| 6,975,147 B2 * | 12/2005 | Hidaka et al. | 327/108 |
| 7,075,847 B2 * | 7/2006 | Kim et al. | 365/222 |
| 7,173,479 B2 * | 2/2007 | Suematsu | 327/537 |
| 7,245,176 B2 * | 7/2007 | Do | 327/536 |
| 7,313,044 B2 * | 12/2007 | Fuhrmann et al. | 365/211 |
| 7,330,388 B1 * | 2/2008 | Chapman et al. | 365/207 |
| 7,345,495 B2 * | 3/2008 | Dangelo et al. | 324/760 |

(Continued)

FOREIGN PATENT DOCUMENTS

JP    10334698 A  *  12/1998

(Continued)

OTHER PUBLICATIONS

Korean Notice of Allowance issued in Korean Patent Application No. KR 10-2006-0049117, mailed Jun. 30, 2008.

(Continued)

*Primary Examiner* — Gail Verbitsky
(74) *Attorney, Agent, or Firm* — IP & T Group LLP

(57) ABSTRACT

An on die thermal sensor (ODTS) of a semiconductor memory device includes a high voltage generating unit for generating a high voltage having a voltage level higher than that of a power supply voltage of the semiconductor memory device; and a thermal information output unit for sensing and outputting a temperature as a thermal information code, wherein the thermal information output unit uses the high voltage as its driving voltage.

20 Claims, 6 Drawing Sheets

U.S. PATENT DOCUMENTS

| | | | |
|---|---|---|---|
| 7,451,053 B2 * | 11/2008 | Jeong | 702/99 |
| 7,864,613 B2 * | 1/2011 | An et al. | 365/211 |
| 2002/0021239 A1 | 2/2002 | Lance et al. | |
| 2002/0118032 A1 * | 8/2002 | Norris et al. | 324/760 |
| 2002/0191467 A1 * | 12/2002 | Matsumoto et al. | 365/222 |
| 2003/0081486 A1 * | 5/2003 | Yamauchi et al. | 365/222 |
| 2005/0174164 A1 * | 8/2005 | Fuhrmann et al. | 327/536 |
| 2005/0185488 A1 * | 8/2005 | Mitani et al. | 365/202 |
| 2005/0201188 A1 | 9/2005 | Donze et al. | |
| 2005/0237689 A1 * | 10/2005 | Maier | 361/103 |
| 2006/0023546 A1 * | 2/2006 | Park | 365/222 |
| 2006/0066384 A1 * | 3/2006 | Jain et al. | 327/378 |
| 2006/0077742 A1 | 4/2006 | Shim et al. | |
| 2006/0087339 A1 * | 4/2006 | Chung et al. | 326/30 |
| 2007/0070761 A1 * | 3/2007 | Byeon et al. | 365/212 |
| 2007/0086248 A1 * | 4/2007 | Daga | 365/185.23 |
| 2007/0091703 A1 * | 4/2007 | Nishimura et al. | 365/212 |
| 2007/0252804 A1 * | 11/2007 | Engel et al. | 345/98 |
| 2008/0002490 A1 * | 1/2008 | Kim | 365/201 |
| 2008/0024203 A1 * | 1/2008 | Lee et al. | 327/536 |
| 2008/0068070 A1 * | 3/2008 | Lee et al. | 327/536 |
| 2009/0323758 A1 * | 12/2009 | Im | 374/100 |
| 2010/0090748 A1 * | 4/2010 | Ito | 327/512 |
| 2010/0110815 A1 * | 5/2010 | Lee et al. | 365/211 |
| 2010/0195412 A1 * | 8/2010 | Furutani et al. | 365/189.05 |

FOREIGN PATENT DOCUMENTS

| | | | |
|---|---|---|---|
| JP | 2005108307 | * | 4/2005 |
| KR | 10-2004-0087152 | | 10/2004 |
| KR | 10-2005-0063880 | | 6/2005 |
| TW | I254312 | | 5/2006 |
| TW | I255459 | | 5/2006 |

OTHER PUBLICATIONS

Notice of Preliminary Rejection issued from the Taiwanese Intellectual Property Office on Dec. 22, 2009.

Patent Certificate and Publication of Granted Chinese Invention issued from Chinese Patent Office on Mar. 23, 2011.

Search Report issued by the Taiwanese Intellectual Propery Office together with an Office Action on Apr. 27, 2009.

Office Action issued by the Chinese Patent Office on Mar. 20, 2009.

* cited by examiner

ON DIE THERMAL SENSOR OF SEMICONDUCTOR MEMORY DEVICE

FIELD OF THE INVENTION

The present invention relates to an on die thermal sensor (ODTS) of a semiconductor memory device, and more particularly, to an ODTS for preventing an error occurring under low power supply voltage circumstance.

BACKGROUND OF THE INVENTION

As operating speed of semiconductor memory devices increases, swing ranges of signals which are interfaced between the semiconductor memory devices become narrower in order to minimize delay time required for transferring the signals.

A unit memory cell of a dynamic random access memory (DRAM) device includes a transistor and a capacitor. The transistor performs a switching operation and the capacitor stores electric charges, i.e., data. The data have a logic level "HIGH" or a logic level "LOW" according to the electric charges stored in the capacitor.

Because of a characteristic of the capacitor, the electric charges are gradually reduced as time passes. Accordingly, a refresh operation which refreshes the stored data in the memory cell at every predetermined period is required to continuously maintain the stored data in the memory cell.

There is power consumption due to the refresh operation performed by a DRAM controller. Accordingly, in a battery operated system under a low power circumstance, it is important to reduce the power consumption due to the refresh operation.

One way to reduce the power consumption due to the refresh operation is to change a period of the refresh operation in response to temperature. In a DRAM device, a time period during which the data of the memory cells can be maintained increases as the temperature decreases. After dividing the temperature into a plurality of regions, if an operating frequency of the refresh operation is lower under a low temperature region, it is possible to reduce the power consumption. Accordingly, it is required to detect the temperature of the DRAM device to lower the operating frequency of the refresh operation.

In addition, the DRAM device generates increasing heat as integration levels and operating speeds are increased. This heat raises an internal temperature of the DRAM device so as to disturb a normal operation of the DRAM device, thereby causing a fault of the DRAM device. As a result, it is required to detect the temperature of the DRAM device to output the detected result.

SUMMARY OF THE INVENTION

It is, therefore, an object of the present invention to provide an on die thermal sensor (ODTS) for to preventing an error occurring under low power supply voltage circumstance.

It is, therefore, another object of the present invention to provide a method for detecting an on die temperature of a semiconductor memory device, and a method for accurately compensating a temperature error which occurs due to an offset voltage between an internal circuit of the semiconductor memory device and an external device during processing.

In accordance with an aspect of the present invention, there is provided an on die thermal sensor (ODTS) of a memory semiconductor device, including: a high voltage generating unit for generating a high voltage having a voltage level higher than that of a power supply voltage of the semiconductor memory device; and a thermal information output unit for sensing and outputting a temperature as a thermal information code, wherein the thermal information output unit uses the high voltage as its driving voltage.

In accordance with a further aspect of the present invention, there is provided a semiconductor memory device, including: an on die thermal sensor (ODTS); and a high voltage generating unit for generating a high voltage having a voltage level higher than that of an external power supply voltage of the semiconductor memory device, wherein the ODTS uses the high voltage as its driving voltage.

DETAILED DESCRIPTION OF THE INVENTION

Hereinafter, an on die thermal sensor (ODTS) in accordance with the present invention will be described in detail referring to the accompanying drawings.

Figure 1:
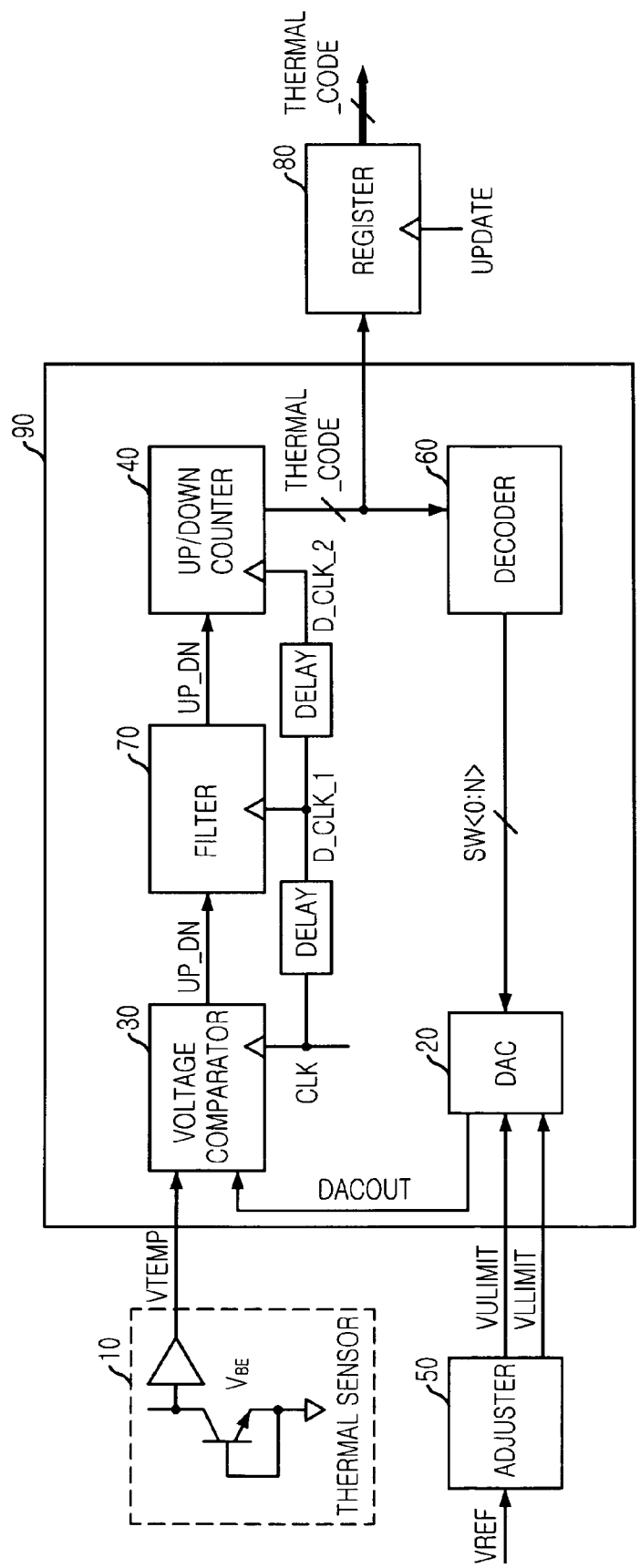
FIG. 1 is a block diagram of an on die temperature sensor (ODTS) of a semiconductor memory device in accordance with a first embodiment of the present invention.

FIG. 1 is a block diagram of an on die thermal sensor (ODTS) of a semiconductor memory device in accordance with a first embodiment of the present invention.

The ODTS in accordance with the first embodiment of the present invention includes a thermal sensor 10, an adjuster 50, a tracking analog to digital converter (ADC) 90, and a register 80.

The thermal sensor 10 detects a temperature of the semiconductor memory device based on a base-emitter voltage $V_{BE}$ variation of a bipolar junction transistor (BJT) provided in a bandgap circuit which is not under the influence of temperature and power supply voltage variation of the semiconductor memory device. Herein, the base-emitter voltage $V_{BE}$ variation of the BJT is about −1.8 mV/° C. In addition, the thermal sensor 10 amplifies the base-emitter voltage $V_{BE}$ variation of the BJT which slightly varies, thereby outputting a first comparing voltage VTEMP corresponding to the temperature with the ratio of 1:1. That is, as the temperature of the semiconductor memory device is higher, the base-emitter voltage $V_{BE}$ variation of the BJT is lower.

The tracking ADC 90 compares the first comparing voltage VTEMP with a second comparing voltage DACOUT, and outputs a thermal information code THERMAL_CODE in response to the comparison result.

The tracking ADC 90 includes a digital to analog converter (DAC) 20, a voltage comparator 30, an up/down counter 40, a decoder 60, and a filter 70.

The DAC 20 receives a maximum variation voltage VULIMIT and a minimum variation voltage VLLIMIT from the adjuster 50 and outputs the second comparing voltage DACOUT in response to an adjusted information code SW<0:N> output from the decoder 60. Herein, the adjusted information code SW<0:N> is a digital value, and a voltage level of the second comparing voltage DACOUT is determined by the maximum variation voltage VULIMIT and the minimum variation voltage VLLIMIT.

The voltage comparator 30 compares the first comparing voltage VTEMP with the second comparing voltage DACOUT to output a code control signal UP_DN. When a voltage level of the first comparing voltage VTEMP is smaller than that of the second comparing voltage DACOUT, the code control signal UP_DN is output to decrease a digital code preset by the up/down counter 40. When the voltage level of the first comparing voltage VTEMP is larger than that of the second comparing voltage DACOUT, the code control signal UP_DN is output to increase the digital code preset by the up/down counter 40.

The up/down counter 40 increases or decreases the preset digital code in response to the code control signal UP_DN output from the voltage comparator 30, and outputs the thermal information code THERMAL_CODE having temperature information.

The adjuster 50 receives a reference voltage VREF from the bandgap circuit which is not under the influence of temperature and power supply voltage variation of the semiconductor memory device, and outputs the maximum variation voltage VULIMIT and the minimum variation voltage VLLIMIT. Accordingly, the maximum variation voltage VULIMIT and the minimum variation voltage VLLIMIT also are not under the influence of temperature and power supply voltage variation of the semiconductor memory device. At this time, a range of the base-emitter voltage $V_{BE}$ variation of the BJT according to the temperature during processing, the semiconductor memory device is different for each die. Therefore, it is required to preset a voltage level of the reference voltage VREF through an external source for accurately compensate the temperature. A voltage difference between the maximum variation voltage VULIMIT and the minimum variation voltage VLLIMIT is uniformly maintained.

The decoder 60 outputs the adjusted information code SW<0:N> to the DAC 20 by decoding the thermal information code THERMAL_CODE output from the up/down counter 40. Herein, the adjusted information code SW<0:N> is used for removing an error due to a transmission time difference which occurs when the DAC outputs the second comparing voltage DACOUT to the voltage comparator 30.

The filter 70 prevents an error occurred when the voltage comparator 30 compares the first comparing voltage VTEMP with the second comparing voltage DACOUT from transferring to the up/down counter 40. The filter 70 transfers the code control signal UP_DN to the up/down counter 40 when a voltage level of the code control signal UP_DN has the same value for three consecutive times.

Hereinafter, an operation sequence of the ODTS is explained in detail.

The voltage comparator 30 compares the first comparing voltage VTEMP with the second comparing voltage DACOUT in synchronization with a clock signal CLK. Herein, the clock signal CLK is input from an external control circuit.

The filter 70 transfers the code control signal UP_DN to the up/down counter 40 in synchronization with a first delay clock signal D_CLK_1 generated by delaying the clock signal CLK by a predetermined time, e.g., a time for comparing the voltages for three times.

The up/down counter 40 receives the code control signal UP_DN to increase or decrease the preset digital code in synchronization with a second delay clock signal D_CLK_2 generated by delaying the first delay clock signal D_CLK_1 by a predetermined time, e.g., an operation time of the filter 70.

The register 80 stores the thermal information code THERMAL_CODE output from the up/down counter 40 to a multi-purpose register (MPR) in response to an update signal UPDATE input from the external control circuit.

Figure 2A:
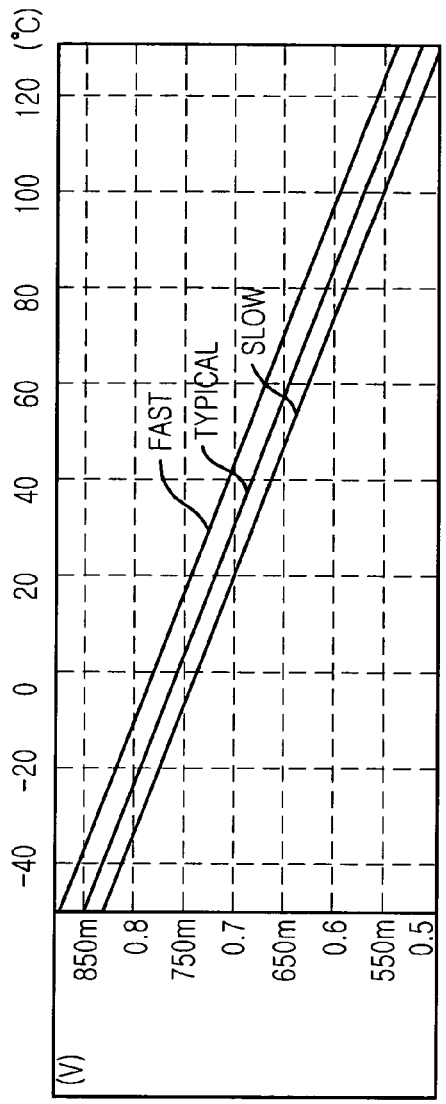
FIG. 2A is a waveform diagram showing a base-emitter voltage of a bipolar junction transistor (BJT) to temperature.
Figure 2B:
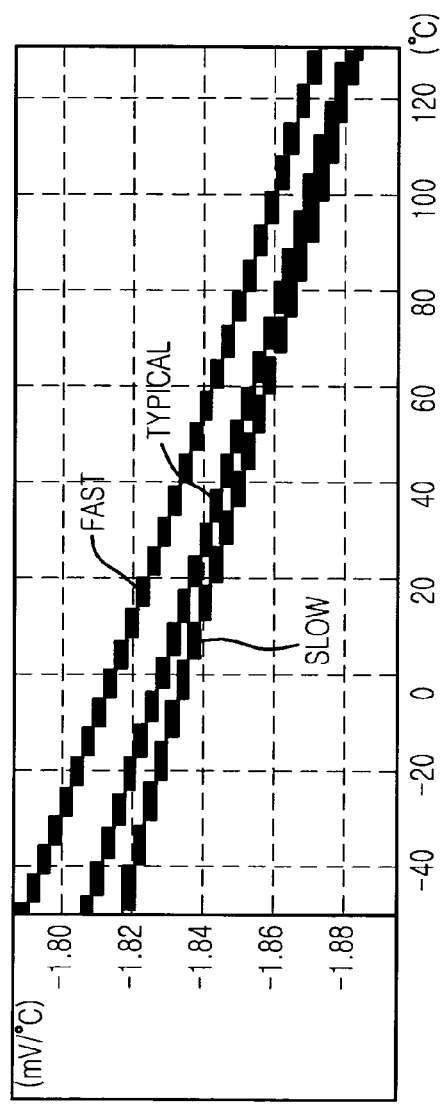
FIG. 2B is a waveform diagram showing a base-emitter voltage variation of a BJT to temperature.

FIG. 2A is a waveform showing the base-emitter voltage $V_{BE}$ of the BJT to the temperature, and FIG. 2B is a waveform showing the base-emitter voltage $V_{BE}$ variation of the BJT to the temperature. Herein, the BJT is provided in the thermal sensor 10 shown in FIG. 1.

Referring to FIG. 2A, the base-emitter voltage $V_{BE}$ of the BJT provided in the thermal sensor 10 linearly varies according to the temperature. Referring to 2B, the base-emitter voltage $V_{BE}$ variation of the BJT linearly also varies according to the temperature.

Both of the ODTS and the semiconductor memory device use the same power supply voltage. Accordingly, as a voltage level of the power supply voltage is lower, an error relating to the thermal information code THERMAL_CODE frequently occur.

For example, if the voltage level of the power supply voltage is about 3.3V at a single data rate dynamic random access memory (SDR DRAM); about 2.5V at a double data rate (DDR) DRAM; about 1.8V at a double data rate II (DDR2) DRAM; and about 1.5V at a double data rate III (DDR3) DRAM, the ODTS uses the same power supply voltage as that of each semiconductor memory device.

As the power supply voltage of the semiconductor memory device is lower, that of the ODTS is also lower. Accordingly, an amplification rate of the base-emitter voltage $V_{BE}$ of the BJT is lower, and thus, a temperature sensitivity of the thermal sensor 10 is also lower. For reasons mentioned above, a temperature sensing ability of the ODTS goes down due to an external noise and a low gain of the voltage comparator. As a result, an accuracy of the thermal information code THERMAL_CODE is does down and an error of the thermal information is frequently occurred.

Figure 3:
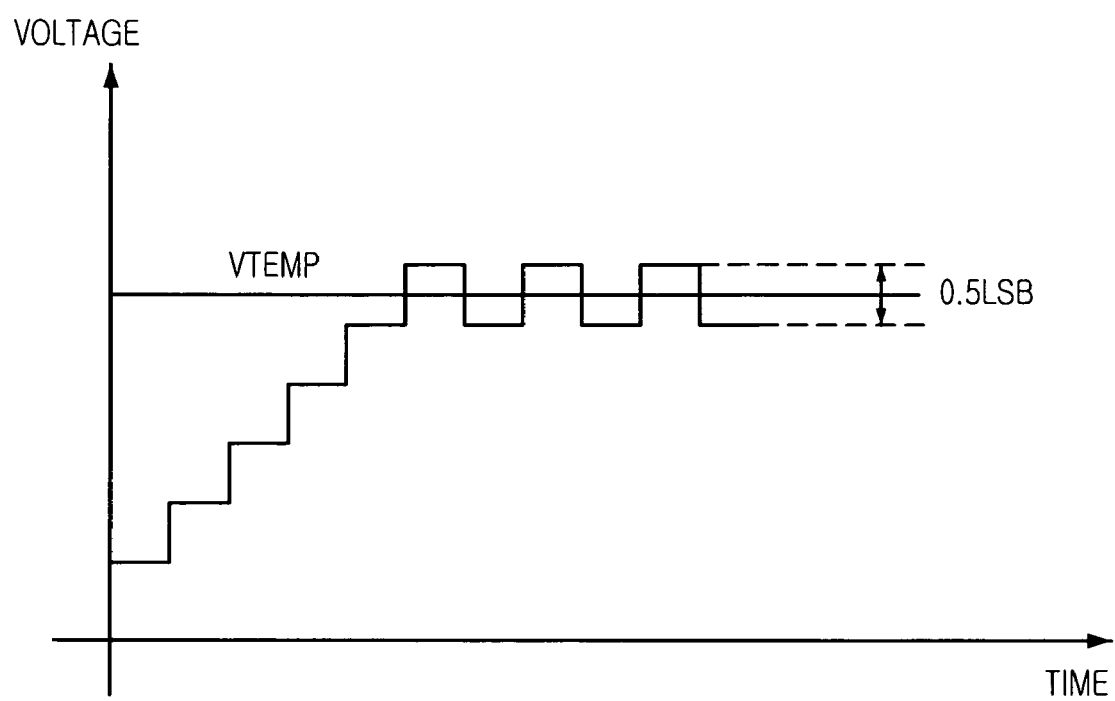
FIG. 3 is a timing diagram showing a relationship between a first comparing voltage and a second comparing voltage input to a tracking ADC when a gain of a comparator shown in FIG. 1 is infinite.

FIG. 3 is a timing diagram showing a relationship between the first comparing voltage VTEMP and the second comparing voltage DACOUT input to the tracking ADC 90 when a gain of the voltage comparator 30 is infinite.

If the gain of the voltage comparator 30 is infinite, quantization error about 0.5 least significant bit (LSB) occurs between the first comparing voltage VTEMP and the second comparing voltage DACOUT. This is because that the voltage comparator 30 tracks the voltage level of the first comparing voltage VTEMP by increasing or decreasing the voltage level of the second comparing voltage DACOUT by a predetermined value corresponding to 1 LSB during comparing the first comparing voltage VTEMP with the second comparing voltage DACOUT.

Figure 4:
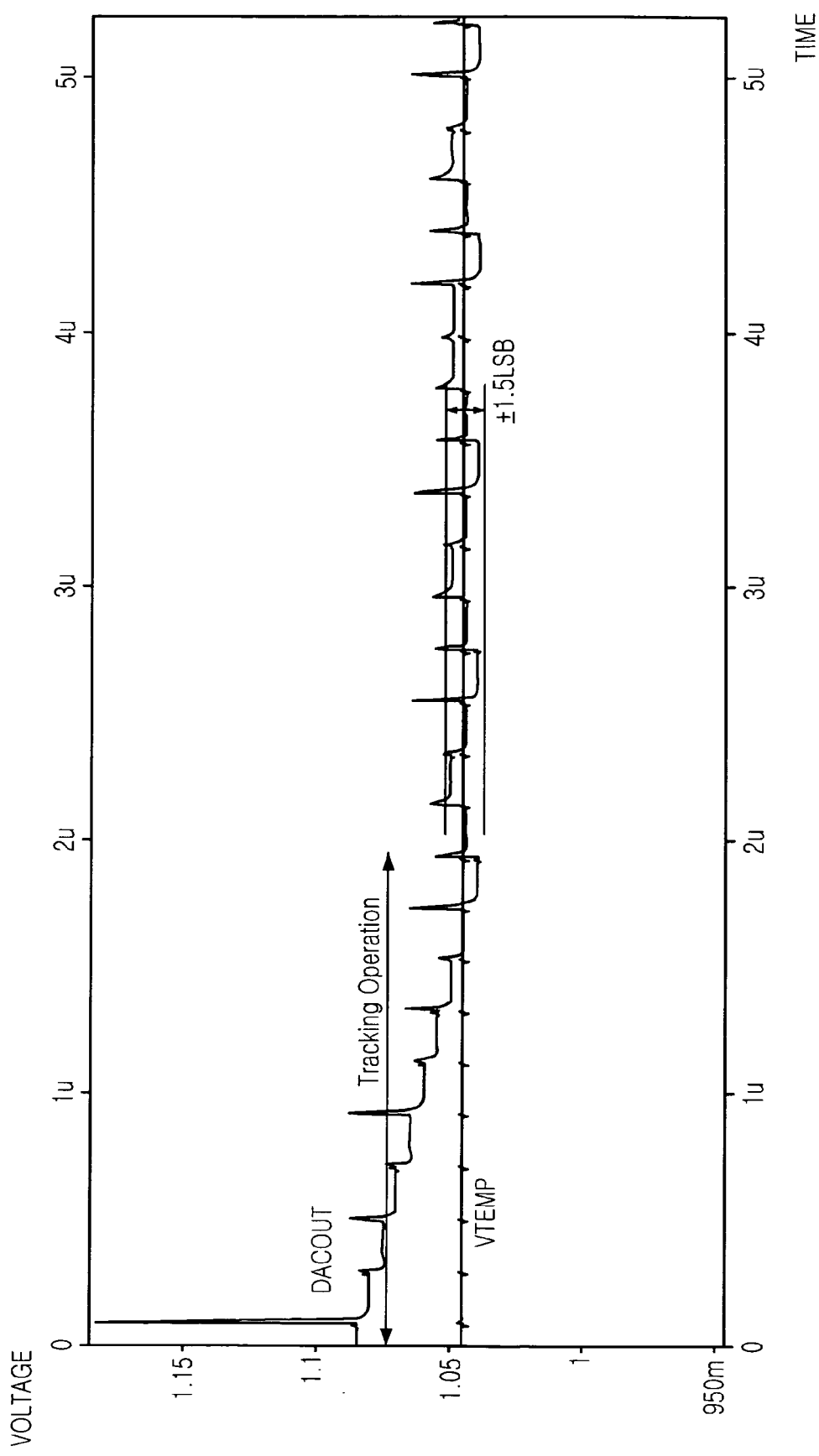
FIG. 4 is a timing diagram showing a relationship between a first comparing voltage and a second comparing voltage input to a tracking ADC when a gain of the comparator shown in FIG. 1 is small.

FIG. 4 is a timing diagram showing a relationship between the first comparing voltage VTEMP and the second comparing voltage DACOUT input to the tracking ADC 90 when a gain of the voltage comparator 30 is small.

If the gain of the voltage comparator 30 is small, quantization error about 1.5 LSB occurs between the first comparing voltage VTEMP and the second comparing voltage DACOUT. Because the gain of the voltage comparator 30 is not enough, the voltage comparator 30 can not compare the voltages up to a value within the quantization error, but increases or decreases the digital code preset by the up/down counter 40 up to a value within the limits of possibility. In this case, the quantization error can be ±3 LSB or more according to the gain of the voltage comparator 30.

As described above, if the gain of the voltage comparator 30 is larger, the quantization error is decreased. However, if the power supply voltage of the ODTS is lower, that of the voltage comparator 30 is also lower. As a result, the gain of the voltage comparator 30 is decreased so that the error relating to the thermal information code THERMAL_CODE increases. Accordingly, provision for the ODTS low power circumstance is required.

Figure 5:
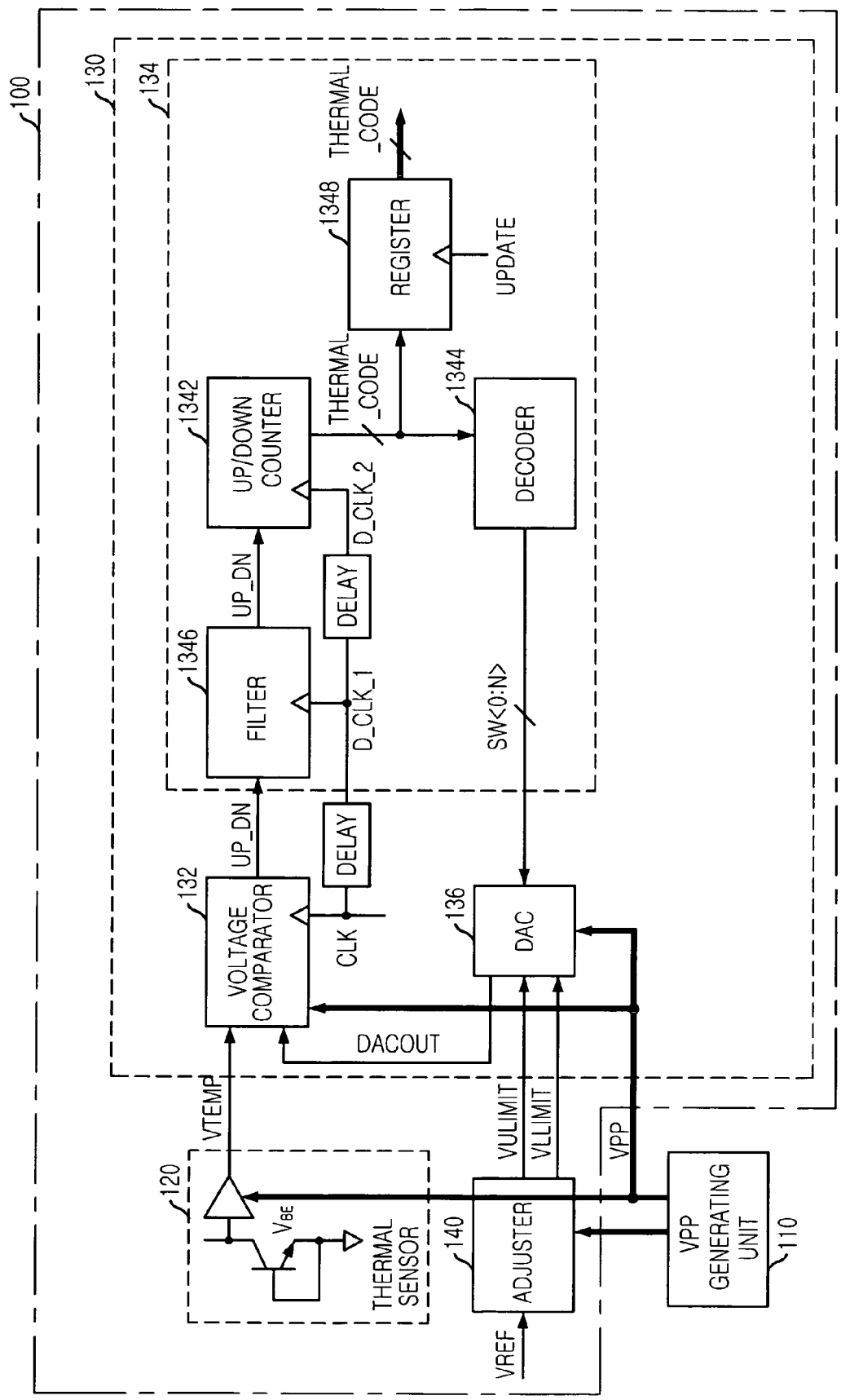
FIG. 5 is a block diagram of an ODTS in accordance with a second embodiment of the present invention.

FIG. 5 is a block diagram of an on die thermal sensor (ODTS) in accordance with a second embodiment of the present invention.

The ODTS in accordance with the second embodiment of the present invention includes a thermal information output unit 100 and a high voltage generating unit 110. The high voltage generating unit 110 generates a high voltage VPP having a voltage level higher than that of a power supply voltage VDD of a semiconductor memory device. The thermal information output unit 100 senses a temperature and outputs the sensed temperature as a thermal information code THERMAL_CODE. In accordance with the second embodiment of the present invention, the thermal information output unit 100 uses the high voltage VPP as its driving voltage to thereby increase accuracy of the thermal information code THERMAL_CODE.

The thermal information output unit 100 includes a thermal sensor 120, a voltage level tracking unit 130, and an adjusting unit 140.

The thermal sensor 120 detects the temperature of the semiconductor memory device according to a base-emitter voltage $V_{BE}$ variation of a bipolar junction transistor (BJT) to thereby output a first comparing voltage VTEMP. Herein, the base-emitter voltage $V_{BE}$ variation of the BJT is provided in a bandgap circuit which is not under the influence of temperature and power supply voltage variation of the semiconductor memory device and is about −1.8 mV/° C. The thermal sensor 120 uses the high voltage VPP as its driving voltage to thereby increase a variable voltage level of the first comparing voltage VTEMP.

The voltage level tracking unit 130 compares a voltage level of a second comparing voltage DACOUT with the voltage level of the first comparing voltage VTEMP, and outputs the thermal information code THERMAL_CODE in response to the comparison result. The voltage level tracking unit 130 uses the high voltage VPP as its driving voltage to thereby increase accuracy of the thermal information code THERMAL_CODE.

The adjusting unit 140 determines a maximum variation voltage VULIMIT and a minimum variation voltage VLLIMIT for tracking the voltage level of the first comparing voltage VTEMP based on a reference voltage VREF, and adjusts the voltage level of the second comparing voltage DACOUT between the maximum variation voltage VULIMIT and the minimum variation voltage VLLIMIT. Herein, the adjusting unit 140 uses the high voltage VPP as its driving voltage to thereby increase a gap between the maximum variation voltage VULIMIT and the minimum variation voltage VLLIMIT.

The voltage level tracking unit 130 includes a voltage comparator 132, a code output unit 134, and a digital to analog converter (DAC) 136.

The voltage comparator 132 compares the voltage level of the first comparing voltage VTEMP with that of the second comparing voltage DACOUT in synchronization with a clock signal CLK input from an external control circuit. The voltage comparator 132 uses the high voltage VPP as its driving voltage to thereby increase a comparison gain.

The code output unit 134 generates the thermal information code THERMAL_CODE in response to the comparison result and outputs an adjusted information code SW<0:N> by decoding the thermal information code THERMAL_CODE.

The DAC 136 determines the voltage level of the second comparing voltage DACOUT based on the adjusted information code SW<0:N>, in order to adjust the voltage level of the second comparing voltage DACOUT between the maximum variation voltage VULIMIT and the minimum variation voltage VLLIMIT. The DAC 136 uses the high voltage VPP as its driving voltage to thereby increase a variable voltage level of the second comparing voltage DACOUT.

The code output unit 134 includes an up/down counter 1342, a decoder 1344, a filter 1346, and a register 1348.

The filter 1346 prevents errors occurred when the voltage comparator 132 compares the first comparing voltage VTEMP with the second comparing voltage DACOUT from transferring to the up/down counter 1342. The filter 1346 operates in synchronization with a first delay clock signal D_CLK_1 generated by delaying the clock signal CLK by a predetermined time, e.g., a time for comparing the voltages for three times.

The up/down counter 1342 increases or decreases a preset digital code in response to the comparison result of the voltage comparator 132, and outputs the thermal information code THERMAL_CODE having temperature information. The up/down counter 1342 operates in synchronization with a second delay clock signal D_CLK_2 generated by delaying the first delay clock signal D_CLK_1 by a predetermined time, e.g., an operating time of the filter 1346.

The decoding unit 1344 outputs the adjusted information code SW<0:N> to the DAC 136 by decoding the thermal information code THERMAL_CODE.

The register 1348 stores the thermal information code THERMAL_CODE output from the up/down counter 1346 in response to an update signal UPDATE input from an external control circuit.

Figure 6:
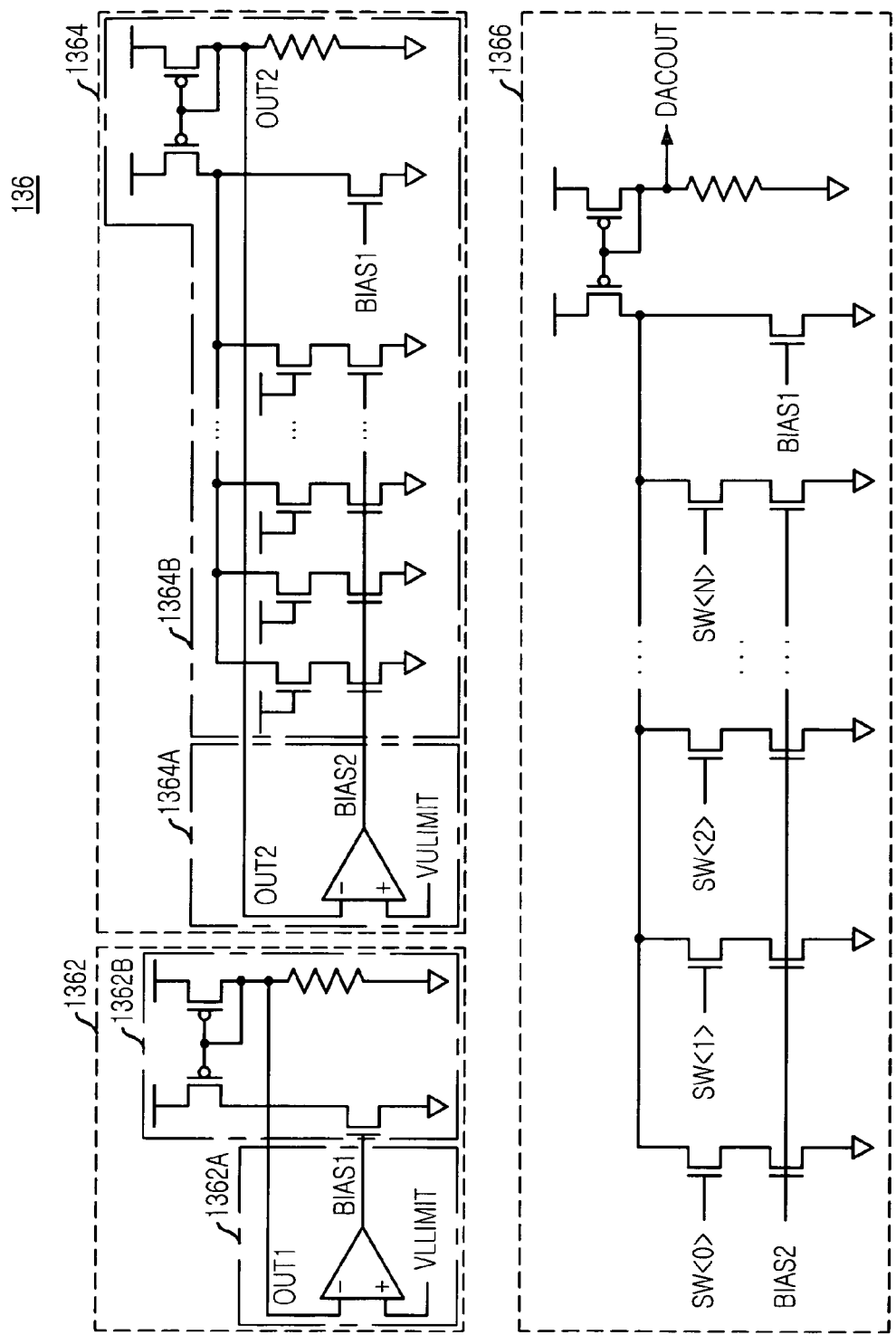
FIG. 6 is a detailed circuit diagram of a digital-analog converter (DAC) shown in FIG. 5.

FIG. 6 is a detailed circuit diagram of the DAC 136 shown in FIG. 5.

The DAC 136 includes a first bias determination unit 1362, a second bias determination unit 1364, and a second comparing voltage determination unit 1366.

The first bias determination unit 1362 determines a voltage level of a first bias voltage BIAS1 by comparing a first output voltage OUT_1 with the minimum variation voltage VLLIMIT. The voltage level of the first output voltage OUT_1 is controlled by the voltage level of the first bias voltage BIAS1.

The second bias determination unit 1364 determines a voltage level of a second bias voltage BIAS2 by comparing a second output voltage OUT_2 with the maximum variation voltage VULIMIT. The voltage level of the second output voltage OUT_2 is controlled by the voltage level of the second bias voltage BIAS2.

The second comparing voltage determination unit 1366 is enabled under the control of the adjusted information code SW<0:N> and determines the voltage level of the second comparing voltage DACOUT based on the first and second bias voltages BIAS1 and BIAS2 output from the first and second bias determination units 1362 and 1364.

The first bias determination unit 1362 includes a first comparator 1362A and a first current mirror circuit 1362B. The first current mirror circuit 1362B determines the voltage level of the first output voltage OUT_1 based on the first bias voltage BIAS1. The first comparator 1362A outputs the first bias voltage BIAS1 by comparing the first output voltage OUT_1 with the minimum variation voltage VLLIMIT.

The second bias determination unit 1364 includes a second comparator 1364A and a second current mirror circuit 1364B. The second current mirror circuit 1364B determines the voltage level of the second output voltage OUT_2 based on the second bias voltage BIAS2. The second comparator 1364A outputs the second bias voltage BIAS2 by comparing the second output voltage OUT_2 with the maximum variation voltage VULIMIT.

The second comparing voltage determination unit 1366 includes a third current mirror circuit which is enabled under the control of the adjusted information code SW<0:N>, i.e., SW<0>, SW<1> to SW<N>, and determines the voltage level of the second comparing voltage DACOUT based on the first and second bias voltages BIAS1 and BIAS2. The third current mirror circuit uses the high voltage as its driving voltage to thereby increase a variable voltage level of the second comparing voltage DACOUT.

If all of SW<0>, SW<1> to SW<N> of FIG. 6 are a logic high level, the voltage level of the second comparing voltage DACOUT is substantially the same as that of the maximum variation voltage VULIMIT. If all of SW<0>, SW<1> to SW<N> of FIG. 6 are a logic low level, the voltage level of the second comparing voltage DACOUT is substantially the same as that of the minimum variation voltage VLLIMIT. Accordingly, the voltage level of the second comparing voltage DACOUT has a value between the maximum variation voltage VULIMIT and the minimum variation voltage VLLIMIT under the control of the adjusted information code SW<0:N>.

The ODTS in accordance with the second embodiment of the present invention includes the high voltage generating unit 110 so that the ODTS uses the high voltage VPP as its driving voltage, the high voltage VPP having a voltage level higher than that of the power supply voltage VDD. Hereinafter, advantages due to using the high voltage VPP instead of the power supply voltage VDD are explained in detail.

First, the thermal sensor 120 uses the high voltage VPP as its driving supply voltage. Accordingly, though the power supply voltage VDD of the semiconductor memory device is lower, an amplification rate of the base-emitter voltage $V_{BE}$ of the BJT is not decreased. As a result, the variable voltage level of the first comparing voltage VTEMP is not decreased even if the power supply voltage VDD of the semiconductor memory device is lower.

The voltage comparator 132 uses the high voltage VPP as its driving voltage. That is, though the power supply voltage VDD of the semiconductor memory device is lower, the comparison gain is not decreased. Accordingly, the quantization error of the comparator can be reduced.

The adjusting unit 140 and the DAC 136 also use the high voltage VPP as its driving voltage. Accordingly, though the power supply voltage VDD of the semiconductor memory device is lower, variable voltage level between the maximum variation voltage VULIMIT and the minimum variation voltage VLLIMIT can be increased, thereby increasing the variable voltage level of the second comparing voltage DACOUT.

As described above, the ODTS in accordance with the present invention includes the high voltage generating unit 110 for generating the high voltage VPP having a voltage level higher than that of the power supply voltage VDD. Accordingly, the thermal information output unit 100 to increase the accuracy of the thermal information code THERMAL_CODE can be implemented even if the power supply voltage VDD of the semiconductor memory device is lower.

The present application contains subject matter related to Korean patent application No. 2006-49117, filed in the Korean Patent Office on May 31, 2006, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An on die thermal sensor (ODTS) of a semiconductor memory device, comprising:
    a high voltage generating unit for generating a high voltage having a voltage level higher than that of an external power supply voltage; and
    a thermal information output unit for sensing a temperature of the semiconductor memory device which uses the external power supply voltage and outputting the sensed temperature as a thermal information code by using the high voltage,
    wherein the thermal information output unit includes a thermal sensor for detecting temperature variation of the semiconductor memory device to output a first comparing voltage used in outputting the thermal information code, the thermal sensor using the high voltage as its driving voltage to increase a variable voltage level of the first comparing voltage.

2. The ODTS as recited in claim 1, wherein the thermal information output unit further includes:
    a voltage level tracking unit for comparing a voltage level of the first comparing voltage with that of a second comparing voltage and outputting the thermal information code in response to the comparison result, wherein the voltage level tracking unit uses the high voltage as its driving voltage to increase accuracy of the thermal information code; and
    an adjusting unit for determining a maximum variation voltage and a minimum variation voltage to track the voltage level of the first comparing voltage based on a preset reference voltage, wherein the adjusting unit uses the high voltage as its driving voltage to increase a gap between the maximum variation voltage and the minimum variation voltage,
    wherein the voltage level of the second comparing voltage is adjusted between the maximum variation voltage and the minimum variation voltage.

3. The ODTS as recited in claim 2, wherein the voltage level tracking unit includes:
    a voltage comparator for comparing the voltage level of the first comparing voltage with that of the second comparing voltage, wherein the voltage comparator uses the high voltage as its driving voltage to increase a comparison gain;
    a code output unit for generating the thermal information code in response to the comparison result and outputting an adjusted information code by decoding the thermal information code; and
    a digital to analog converter (DAC) for determining and adjusting the voltage level of the second comparing voltage between the maximum variation voltage and the minimum variation voltage based on the adjusted information code, wherein the DAC uses the high voltage as its driving voltage to thereby increase a variable voltage level of the second comparing voltage.

4. The ODTS as recited in claim 3, wherein the DAC includes:
   a first bias determination unit for determining a voltage level of a first bias voltage by comparing a first output voltage with the minimum variation voltage, wherein a voltage level of the first output voltage is controlled by the voltage level of the first bias voltage;
   a second bias determination unit for determining a voltage level of a second bias voltage by comparing a second output voltage with the maximum variation voltage, wherein a voltage level of the second output voltage is controlled by the voltage level of the second bias voltage; and
   a second comparing voltage determination unit, enabled under the control of the adjusted information code, for determining the voltage level of the second comparing voltage based on the first and second bias voltages.

5. The ODTS as recited in claim 4, wherein the first bias determination unit includes:
   a current mirror circuit for determining the voltage level of the first output voltage based on the first bias voltage; and
   a comparator for outputting the first bias voltage by comparing the first output voltage with the minimum variation voltage.

6. The ODTS as recited in claim 4, wherein the second bias determination unit includes:
   a current mirror circuit for determining the voltage level of the second output voltage based on the second bias voltage; and
   a comparator for outputting the second bias voltage by comparing the second output voltage with the maximum variation voltage.

7. The ODTS as recited in claim 4, wherein the second comparing voltage determination unit includes a current mirror circuit, enabled under the control of the adjusted information code, for determining the voltage level of the second comparing voltage based on the first and second bias voltages, the current mirror circuit uses the high voltage as its driving voltage to increase the variable voltage level of the second comparing voltage.

8. The ODTS as recited in claim 3, wherein the code output unit includes:
   an up/down counter for increasing or decreasing a preset digital code in response to the comparison result of the voltage comparator and outputting the thermal information code; and
   a decoding unit for outputting the adjusted information code by decoding the thermal information code.

9. The ODTS as recited in claim 8, wherein the code output unit further includes:
   a filter for preventing an error occurring when the voltage comparator compares the first comparing voltage with the second comparing voltage from being transferred to the up/down counter; and
   a register for storing the thermal information code output from the up/down counter.

10. The ODTS as recited in claim 9, wherein the voltage comparator operates in synchronization with a clock signal input from an external control circuit; the filter operates in synchronization with a first delay clock signal generated by delaying the clock signal by a predetermined time; the up/down counter operates in synchronization with a second delay clock signal generated by delaying the first delay clock signal by a predetermined time; and the register operates in response to an update signal input from the external control circuit.

11. A semiconductor memory device, comprising:
    an on die thermal sensor (ODTS); and
    a high voltage generating unit for generating a high voltage having a voltage level higher than that of an external power supply voltage of the semiconductor memory device,
    wherein the ODTS includes a thermal information output unit for sensing a temperature of the semiconductor memory device which uses the external power supply voltage and outputting the sensed temperature as a thermal information code by using the high voltage, and
    wherein the thermal information output unit includes a thermal sensor for detecting temperature variation of the semiconductor memory device to output a first comparing voltage used in outputting the thermal information code, the thermal sensor using the high voltage as its driving voltage to increase a variable voltage level of the first comparing voltage.

12. The semiconductor memory device as recited in claim 11, wherein the ODTS further includes:
    a voltage level tracking unit for comparing a voltage level of the first comparing voltage with that of a second comparing voltage and outputting a thermal information code in response to the comparison result, wherein the voltage level tracking unit uses the high voltage as its driving voltage to increase accuracy of the thermal information code; and
    an adjusting unit for determining a maximum variation voltage and a minimum variation voltage to track the voltage level of the first comparing voltage based on a preset reference voltage, wherein the adjusting unit uses the high voltage as its driving voltage to increase a gap between the maximum variation voltage and the minimum variation voltage,
    wherein the voltage level of the second comparing voltage is adjusted between the maximum variation voltage and the minimum variation voltage.

13. The semiconductor memory device as recited in claim 12, wherein the voltage level tracking unit includes:
    a voltage comparator for comparing the voltage level of the first comparing voltage with that of the second comparing voltage, wherein the voltage comparator uses the high voltage as its driving voltage to increase a comparison gain;
    a code output unit for generating the thermal information code in response to the comparison result and outputting an adjusted information code by decoding the thermal information code; and
    a digital to analog converter (DAC) for determining and adjusting the voltage level of the second comparing voltage between the maximum variation voltage and the minimum variation voltage based on the adjusted information code, wherein the DAC uses the high voltage as its driving voltage to thereby increase a variable voltage level of the second comparing voltage.

14. The semiconductor memory device as recited in claim 13, wherein the DAC includes:
    a first bias determination unit for determining a voltage level of a first bias voltage by comparing a first output voltage with the minimum variation voltage, wherein a voltage level of the first output voltage is controlled by the voltage level of the first bias voltage;
    a second bias determination unit for determining a voltage level of a second bias voltage by comparing a second output voltage with the maximum variation voltage, wherein a voltage level of the second output voltage is controlled by the voltage level of the second bias voltage; and a second comparing voltage determination unit, enabled under the control of the adjusted information code, for determining the voltage level of the second comparing voltage based on the first and second bias voltages.

15. The semiconductor memory device as recited in claim 14, wherein the first bias determination unit includes:
   a current mirror circuit for determining the voltage level of the first output voltage based on the first bias voltage; and
   a comparator for outputting the first bias voltage by comparing the first output voltage with the minimum variation voltage.

16. The semiconductor memory device as recited in claim 14, wherein the second bias determination unit includes:
   a current mirror circuit for determining the voltage level of the second output voltage based on the second bias voltage; and
   a comparator for outputting the second bias voltage by comparing the second output voltage with the maximum variation voltage.

17. The semiconductor memory device as recited in claim 14, wherein the second comparing voltage determination unit includes a current mirror circuit, enabled under the control of the adjusted information code, for determining the voltage level of the second comparing voltage based on the first and second bias voltages, the current mirror circuit uses the high voltage as its driving voltage to increase the variable voltage level of the second comparing voltage.

18. The semiconductor memory device as recited in claim 13, wherein the code output unit includes:
   an up/down counter for increasing or decreasing a preset digital code in response to the comparison result of the voltage comparator and outputting the thermal information code; and
   a decoding unit for outputting the adjusted information code by decoding the thermal information code.

19. The semiconductor memory device as recited in claim 18, wherein the code output unit further includes:
   a filter for preventing an error occurring when the voltage comparator compares the first comparing voltage with the second comparing voltage from being transferred to the up/down counter; and
   a register for storing the thermal information code output from the up/down counter.

20. The semiconductor memory device as recited in claim 19, wherein the voltage comparator operates in synchronization with a clock signal input from an external control circuit; the filter operates in synchronization with a first delay clock signal generated by delaying the clock signal by a predetermined time; the up/down counter operates in synchronization with a second delay clock signal generated by delaying the first delay clock signal by a predetermined time; and the register operates in response to an update signal input from the external control circuit.

* * * * *